INVENTORS.
EDWARD W. HUGHES
RAYMOND G. DUNN

INVENTORS.
EDWARD W. HUGHES
RAYMOND G. DUNN

INVENTORS.
EDWARD W. HUGHES
RAYMOND G. DUNN

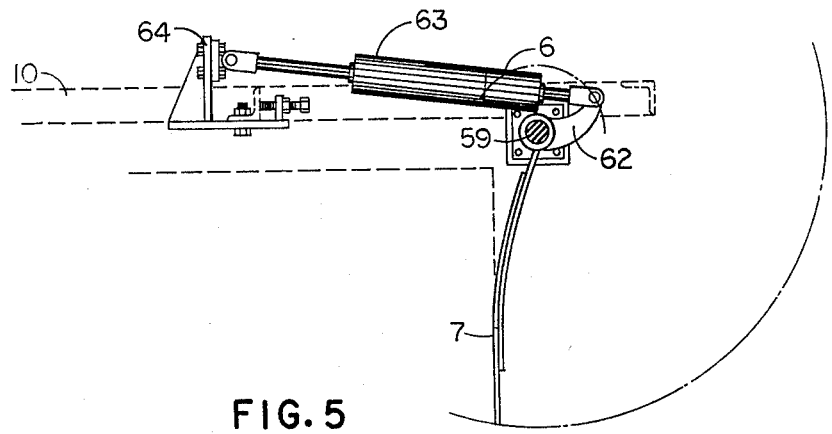
FIG. 5
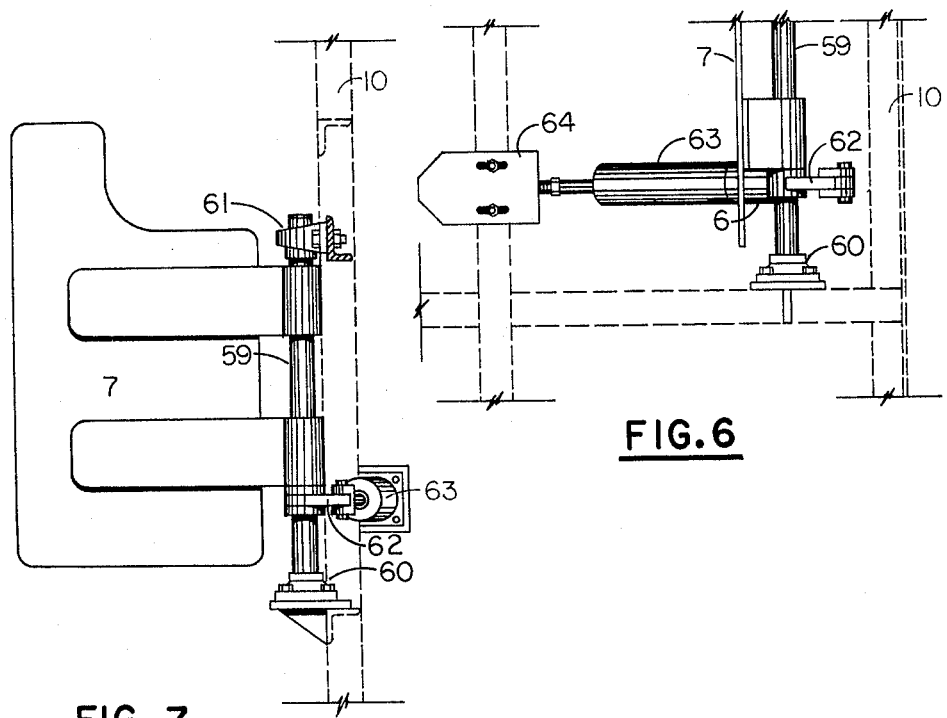
FIG. 6
FIG. 7
INVENTORS.
EDWARD W. HUGHES
RAYMOND G. DUNN

INVENTORS.
EDWARD W. HUGHES
RAYMOND G. DUNN

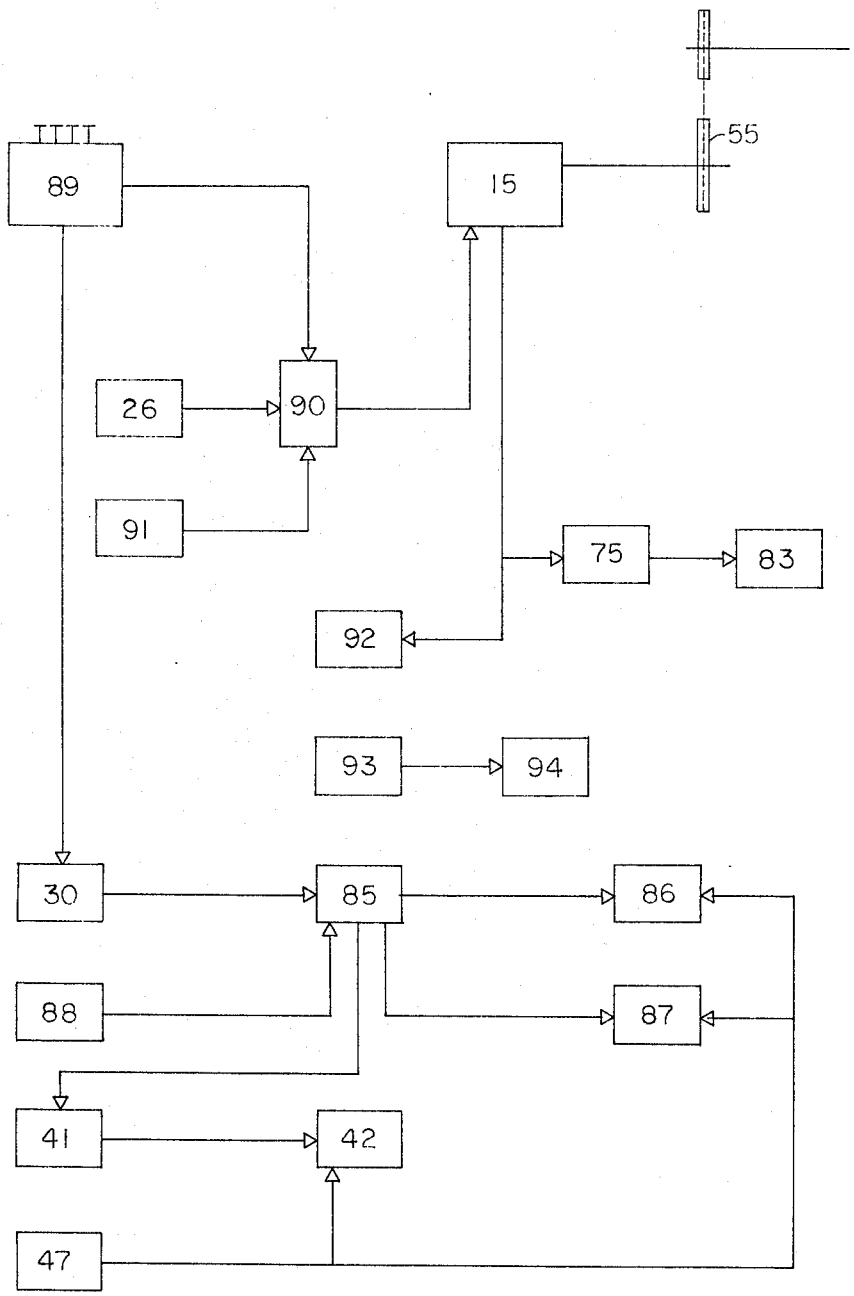

United States Patent Office 3,288,312
Patented Nov. 29, 1966

3,288,312
METHOD AND APPARATUS FOR THE SORTING, COLLECTING AND STACKING OF SHEET MATERIALS
Edward W. Hughes, Yakima, Wash., and Raymond G. Dunn, Portland, Oreg., assignors to Western Machinery Corporation, Portland, Oreg., a corporation of Oregon
Filed Nov. 29, 1963, Ser. No. 326,803
11 Claims. (Cl. 214—11)

This invention relates generally to a method and apparatus by which sheet-like materials such as paper, plastic sheets, panel products, or veneer can be sorted as to size and other physical characteristics, collected and stacked uniformly so that all sheets of one classification can be removed from the apparatus in unit packages.

More specifically, it is designed to sort and stack either green or dry veneer of varying sizes and/or physical characteristics.

Prior to this invention, green veneer was cut to varying widths by a veneer clipper operated by one man as the veneer was carried through the clipper on a continuous belt conveyor. Upon cutting or clipping the veneer, the individual pieces or sheets of veneer were removed from the conveying system by one of two possible methods. The first method involved the handpulling of the veneer sheets off the conveying belt by men stationed at intervals along the conveyor. These same men stacked the veneer in different piles according to size and other physical characteristics such as moisture content and grade. The second method involved handpushing the veneer into mechanical collecting devices commonly called "swedes" that were stationed along the conveying system. In this case, men stationed along the conveying system pushed the veneer into the proper swede according to size and other physical characteristics. The swede consisted basically of a large box at the top, at one end of which were positioned two powered rolls operating in the same manner as a washing machine clothes wringer. Upon pushing the veneer between the two powered rolls of the swede, the veneer was drawn into the box or bin and stacked indiscriminately. When the bin was full, the load was removed from the swede from the end opposite the powered rolls.

In the case of handpulling of veneer, a large number of men were required to perform a job involving considerable fatigue due to the weight of the veneer being pulled, the fast pace at which they were required to work, and the long motions required in removing the veneer from the conveyor and stacking it in piles behind them. In the case of mechanical swedes, a considerable quantity of veneer was broken or otherwise damaged through improper alignment of the veneer when it was pushed or fed through the powered rolls. This problem was due both to improper feeding at the swedes by the men involved and to the characteristics of the veneer which does not always lie flat. Another fault of the swedes was that the resulting stacks of veneer were not uniform due to the indiscriminate falling of one piece of veneer on top of another. This invention displaces the men presently required to pull veneer by hand or feed veneer into swedes and requires only one man to make decisions as to how the veneer is to be sorted and stacked instead of the several men performing both functions previously required.

Two methods of sorting and stacking of dry veneer were in common use before the inception of this invention. The first involved the discharging of veneer indiscriminately onto a stationary table directly in front of a veneer dryer by a conveying system. The stationary veneer was then graded, sorted and stacked in appropriate piles by several men stationed in front of the table. This method of sorting and stacking was slow and awkward due to the indiscriminate positions of the different grades and sizes of veneer on the sorting table with respect to the positions of the various piles of graded and sorted veneer. This arrangement required many movements to be made by the men performing the operation resulting in fatigue and poor efficiency. Furthermore, when the accumulation of veneer was allowed to build up on the table, the difficulty of the sorting and grading was greatly accentuated.

The second method of sorting and stacking dry veneer involved the depositing of dry veneer on a conveying system traveling at right angles to the dryer discharge in place of the sorting table mentioned above. As the veneer traveled along this conveying system, it was graded by one man and then pulled off the conveyor onto appropriate piles by men stationed along the conveyor. While less weight is involved in the handling of dry veneer than with green veneer, the operation is still fatiguing due to the faster pace required of the men and the many long motions involved in the removal and stacking of the veneer by hand along the conveyor. (Mechanical swedes have not been used in the past for this operation.)

The principal object of this invention is to sort, collect and stack sheet materials such as veneer as they travel along a conveying system in such a manner that all sheets of one classification can be collected as a uniform package of sheets and removed from the sorting, collecting, and stacking mechanism as a unit load of known classification, all operations required to perform this task being incorporated in the invention and controlled and operated by one individual.

It is also the objective of this invention to transport sheet materials such as veneer into and out of the collecting mechanisms in such a manner that the sheets will not be mechanically damaged thereby.

It is the object of this invention to stack the sheets in orderly piles that can be conveniently removed from the collecting and stacking mechanism.

It is also the object of this invention to provide a storage device within the collecting and stacking mechanism that will allow continuous operation of the conveying system at the same time as stacks of material are being removed from the collecting mechanism.

Another object of this invention is to provide adjustments within the collecting and stacking mechanism so that a variety of sizes of sheet materials may be collected by the same mechanism though not at the same time.

A further object of this invention is that the collecting and stacking mechanism can be built as a single unit to collect and stack sheets that have been previously sorted or the same mechanism can be assembled in multiples, the number of units required being determined by the number of sorts desired.

To achieve the above objectives, this invention will function as described below and illustrated in FIGS. 1 to 9 of the accompanying drawings.

In the drawings:

FIGS. 5, 6 and 7 are plan, side and front views respectively of the bumper-gate mechanism which is at the unloading end of each collecting and stacking mechanism;

FIG. 9 is a diagram of the electrical control system used to operate the collecting and stacking mechanism and the parts thereof in proper sequence.

The electrical system and the essential parts thereof are disclosed more fully in patent application Serial No. 9,587. It is recommended that this system be used to operate and control this invention, but it must be recognized that other control systems may exist or be developed that will function equally well within the requirements of individual application criteria.

The sequence of operations of this invention is such that the following operations are performed. Sheet materials such as veneer from an unspecified source are transferred onto the conveying system 1, FIG. 1, and carried near an individual stationed at an appropriate position near the conveyor where he examines such sheet to determine into which bin the sheet is to be deposited. Upon making his decision, he manually energizes an electrical switch 89, FIG. 9, which in turn energizes a magnet positioned on the periphery of a wheel 15 rotating at a speed which is synchronized with the speed of conveyor 1. The energized magnet continues to rotate until it reaches a coil that de-energizes the magnet. The distance that the magnet travels before being de-energized is equivalent to the distance the veneer sheet travels from the time the operator has determined how it is to be sorted to the time it has reached the collecting mechanism by which it is to be collected and stacked. The magnetic memory system mentioned above is disclosed in patent application Serial No. 9,587, and although described here for a complete understanding of the present invention, the specific details thereof constitute no part of such invention.

Figure 1:
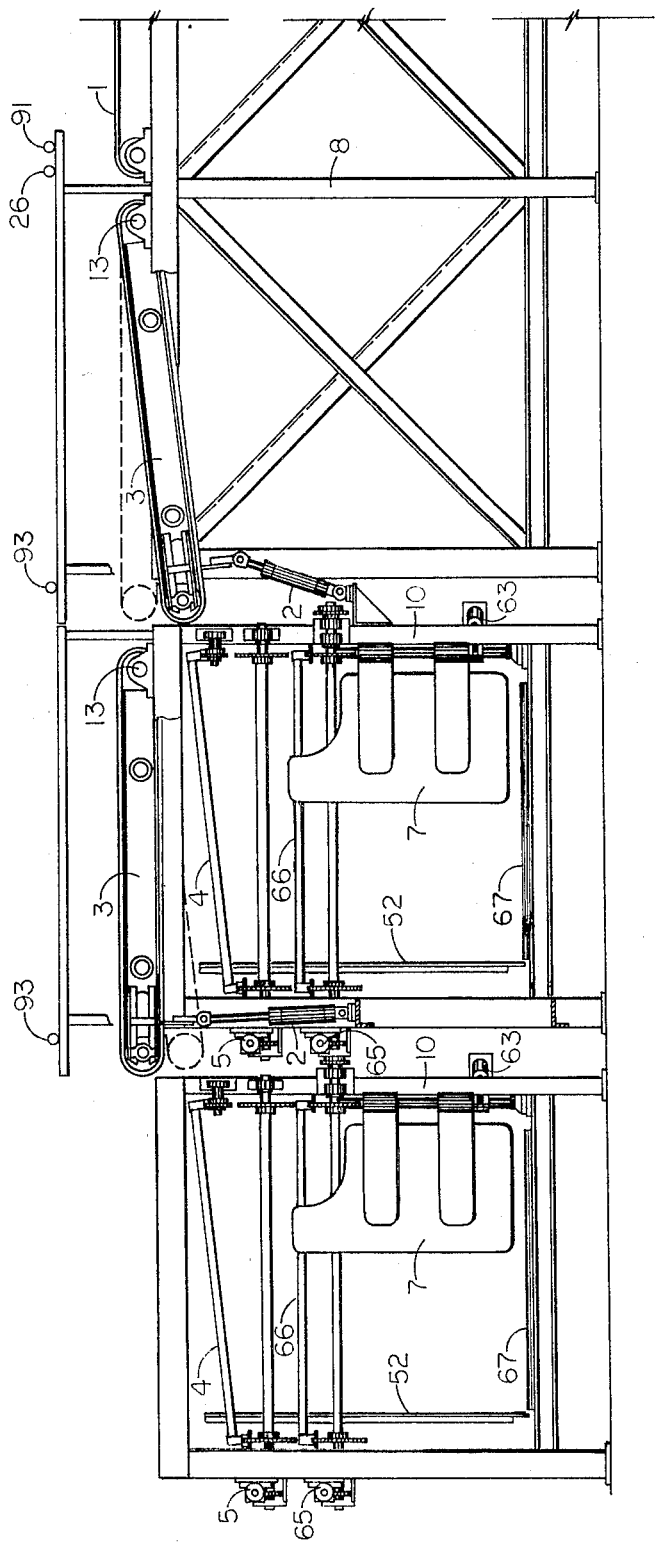
FIG. 1 is a front view of two collecting and stacking mechanisms arranged side by side.

The conveying system above the collecting and stacking bins, or pockets, consists of tipple 3, FIG. 1, approximately of the same length as each collecting bin is wide. These tipples 3 are constructed of individual frames 12, FIG. 2, one end of which pivots about a shaft 13 at the infeed side of the collecting bin. When the sheet has reached the tipple 3 immediately upstream from the preselected bin in which such sheet is to be collected, the tipple pivots downwardly to direct the sheet through the entrance opening at the upper end of the bin. Within the bin, the sheet slides onto two inclined receiving rods 4 extending in the conveying direction across the interior of the bin and whose long axis is oriented nearly parallel to the tipple 3 in the latter's downward, tilted position. After the sheet is fully supported on the receiving rods 4, the tipple 3 returns to its horizontal position unless the following sheet is to be collected by the same collecting bin. When the trailing edge of each sheet entering the collecting bin reaches a certain point near the outer end of tipple 3, it passes a photocell 93 which causes the two receiving rods 4 on which the sheet is resting to retract horizontally in opposite directions from underneath the sheet, causing the sheet to drop to a second, unloading conveyor means defining the bottom of the collecting bin. In order that sheets will not fall indiscriminately, stationary shears, or guides, 48, 49, shown in FIGS. 2, 3 and 4, of proper angles are provided to guide the fall of the sheet. To further provide proper alignment of sheets after they fall, a movable bumper gate 7 at the unloading end of the bin periodically bumps the end edges of such stacked sheets into vertical alignment.

Figure 8:
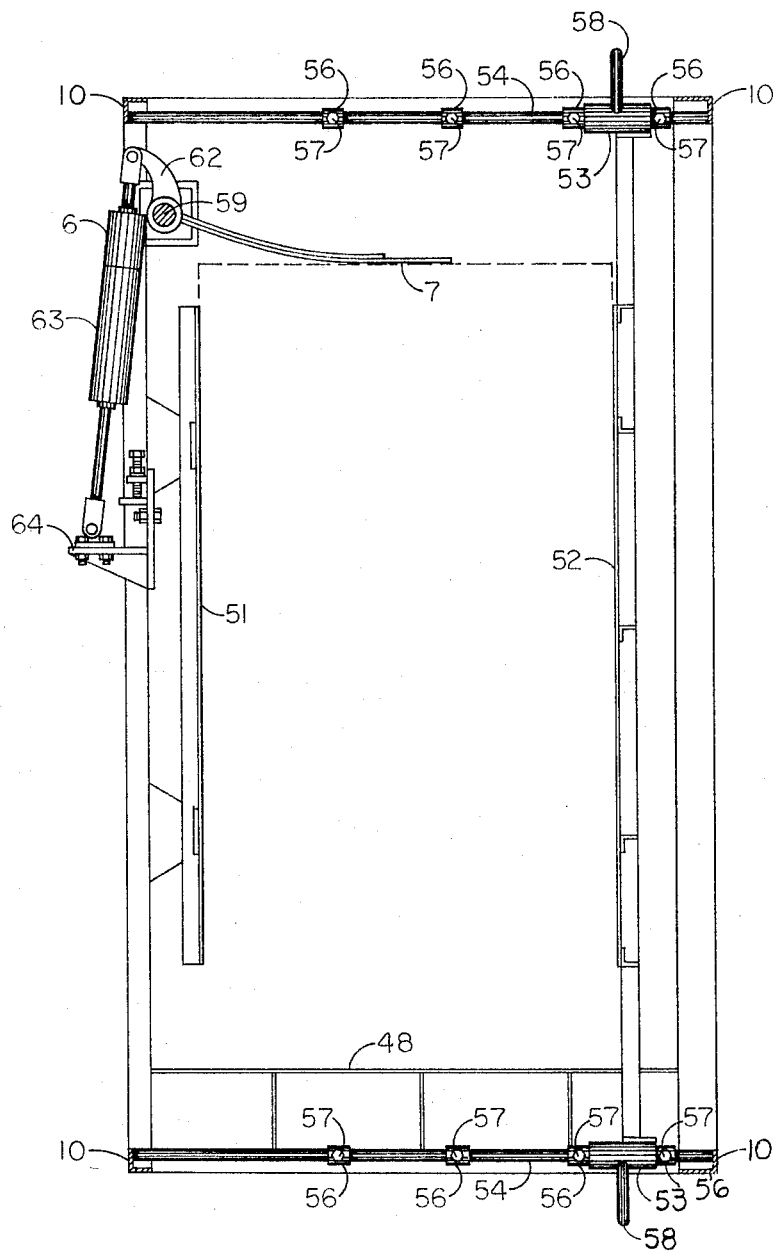
FIG. 8 is a plan view of the adjustable shear mechanism.

When the stack of sheets at the bottom of the collecting bin reaches a predetermined height, a pre-set counter 30, FIG. 9, actuated by selector switch 89 triggers air cylinder 63, FIG. 8, on bumpergate 7 causing the bumpergate 7 to swing open, allowing the stack of sheets to be removed horizontally from the bin through its lower end opening. Opening of the gate 7 trips a switch 41 to energize motor 42, FIGS. 3 and 9, which powers several rolls 67 beneath the stacked sheets, causing the stack to move out of the collecting bin onto a storage conveyor or other suitable device, which could be any one of several types common to the art.

Figure 4:
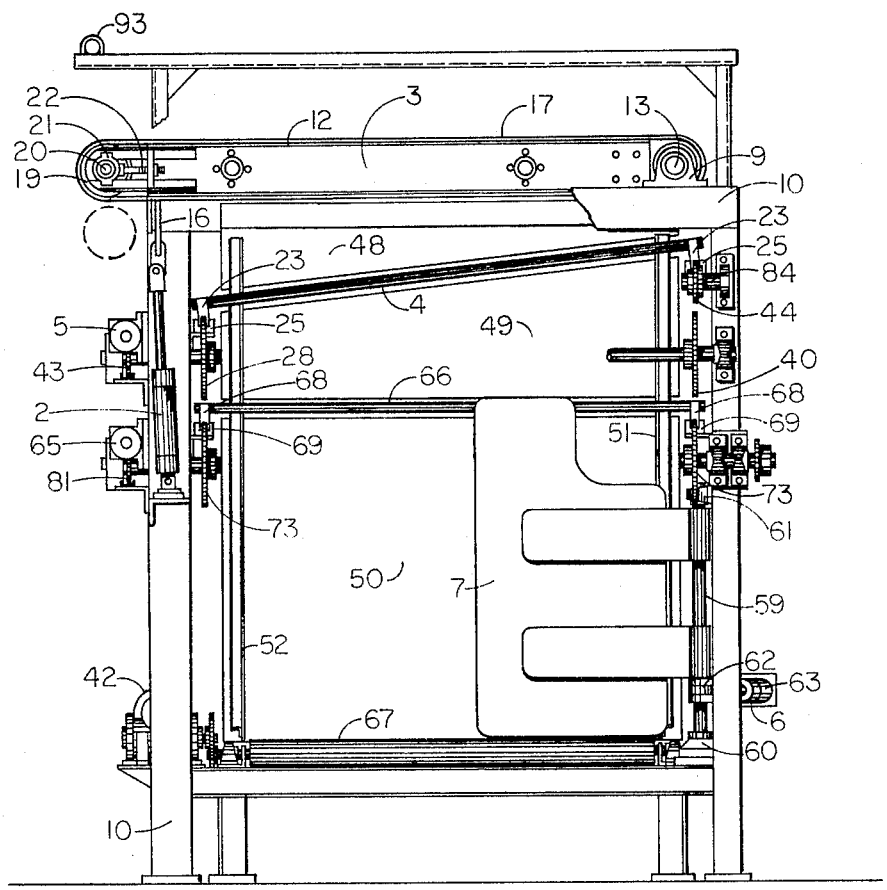

The same switch that causes bumpergate 7 to swing open also energizes another air valve which causes two previously retracted, parallel accumulating rods 66, FIG. 4, to come into position beneath the receiving rods 4. Thus, the sorting apparatus can be operated continuously during unloading of the collecting bin. When the stack of sheets removed from the collecting bin reaches a predetermined point, the stack trips a limit switch 47, FIG. 9, causing bumpergate 7 to swing closed again, parallel to the end of the collecting bin. Simultaneously, limit switch 41 is de-energized to retract accumulator rods 66 from beneath sheets accumulated thereon, thus dropping such sheets as a stack to the empty bottom of the bins. At this point the cycle is complete, and the mechanism continues to operate in the predescribed manner. The collecting mechanisms of each bin are similar in operation if more than one is involved.

Having given a broad description of the sequence of operations of the invention to orient the reader, a detailed description follows.

Sheets of veneer or other material are carried by conveyor 1 across an inspection area of constant width and within clear sight of the operator of this invention. Within the time that the sheet travels across the inspection area, the operator shall make a decision as to how the sheet is to be sorted and collected. Upon making his decision he will close switch 89, FIG. 9, while the sheet is still within the inspection area. Switch 89 may be a multiposition switch so that only one switch is needed for all sorting decisions, or may be one of several switches of the same type, one of which would be required for each different sort decision. Switch 89 energizes relay 90 which is sealed in through its own normally open contacts and through photocells 26 and 91. As the examined sheet leaves the inspection area, it first actuates photocell 91 and thus energizes a Magnastat write relay positioned on the magnetic memory wheels 15 through the contacts of relay 90 previously selected. An instant later, the sheet actuates photocell 26 which momentarily interrupts the seal path that is holding in relay 90; relay 90 drops out and the system is ready to receive the next input decision of the operator.

The energizing of the Magnastat write relay will pass a half-wave direct current through a magnetizing head while the releasing of relay 90 will also de-energize the write relay and thus provide only a momentary energization of the magnetizing head. The magnetizing head will impose a short length of magnetic signal on the rim of Magnastat wheel 15 which is mechanically connected to the movement of the conveyor 1 by sprockets 55, FIG. 9, and chains common in the art so that any movement of the examined sheets on the conveyor will be escorted by a corresponding movement of the magnetic impulse as the Magnastat wheel 15 or disk is rotated. Three-hundred degrees (300°) of rotation of the Magnastat disk 15 will correspond to full travel of conveyor 1 from the input station to the final sorting mechanism or bin. As the examined sheet approaches the bin corresponding to the input decision, the magnetic impulse will just be arriving at output sensing switches located at the appropriate position proportionate to the distance between the inspection area and the appropriate collecting mechanism, along the circumference of the Magnastat wheel or disk. As the decision signal actuates the output sensing switches of the Magnastat in proper code arrangement, a signal will pass to solenoid 92 which in turn actuates an air valve causing air cylinder 2, FIGS. 3 and 4, to lower tipple 3 so that the selected sheet will travel onto the normally retracted receiving rods 4 of the collecting mechanism. In order that the receiving rods 4 will catch the sheet as it enters the collecting mechanism a photocell 93 is located at the end of the tipple 3 which will be activated as the leading edge of the sheet closes the switch. Photocell 93 will in turn energize a solenoid 94 which will activate an air valve causing air cylinder 5, FIG. 3, to move receiving rods 4 to their extended position. As soon as the sheet passes over photocell 93 the switch will de-activate solenoid 94 causing air cylinder 5 to retract receiving rods 4 which in turn causes the sheet to fall by gravity to the bottom of the collecting mechanism. Time delay relay 75 will also be activated by the same Magnastat decision signal mentioned previously, and this relay will actuate solenoid 83 connected to an air valve which in turn will activate air cylinder 6, FIG. 5, which will cause bumper-gate 7 to instantly retract slightly from the interior of the collecting mechanism. It will be noted that this activity takes place before the selected sheet enters the collecting mechanism. The bumper-gate 7 will remain retracted until a fixed time period has elapsed as determined by time delay switch 75. The length of the time period is determined by the time it takes for the sheet to travel from the inspecting area to the bottom of the collecting mechanism. Following the elapse of the time period, time-delay switch 75 will release solenoid 83 de-activating cylinder 6 causing the bumper-gate 7 to move forward into the collecting mechanism and align the sheet that has fallen into the collecting mechanism.

In order that the decision impulse on the Magnastat wheel 15 will not operate the same collecting mechanism again without receiving a new decision from the operator, an erasing head is positioned near the write relay which will de-energize and remove all previous decision impulses as Magnastat wheel 15 rotates through the position of the erasing head. Thus the area of the Magnastat wheel entering the position of write relay is always clear of previous impulses and ready to receive new decision impulses. This completes the electrical circuitry of the sorting and actuating system selected to operate the various collecting mechanisms in proper sequence. The number of relays, switches, solenoids and air valves mentioned above are multiples of the number of collecting mechanisms designed in any one installation, the exact number being only limited to the number of sorts desired.

Conveyor 1 is supported by a framework 8, FIG. 1, designed as required by application criteria until the conveyor reaches the collecting mechanisms which then form the supporting framework 10 for continuance of conveyor 1 which continues as short tipples 3 individually mounted on bearings 9 on top of the collecting mechanisms. All tipples 3 are provided with motive power through chains and sprockets common in design and to the art and each tipple is interconnected through roller chains and sprockets 11 to a single source of motive power normally in the form of an electric motor so that all tipple belts 17, FIG. 4, travel at the same rate of speed.

Figure 2:
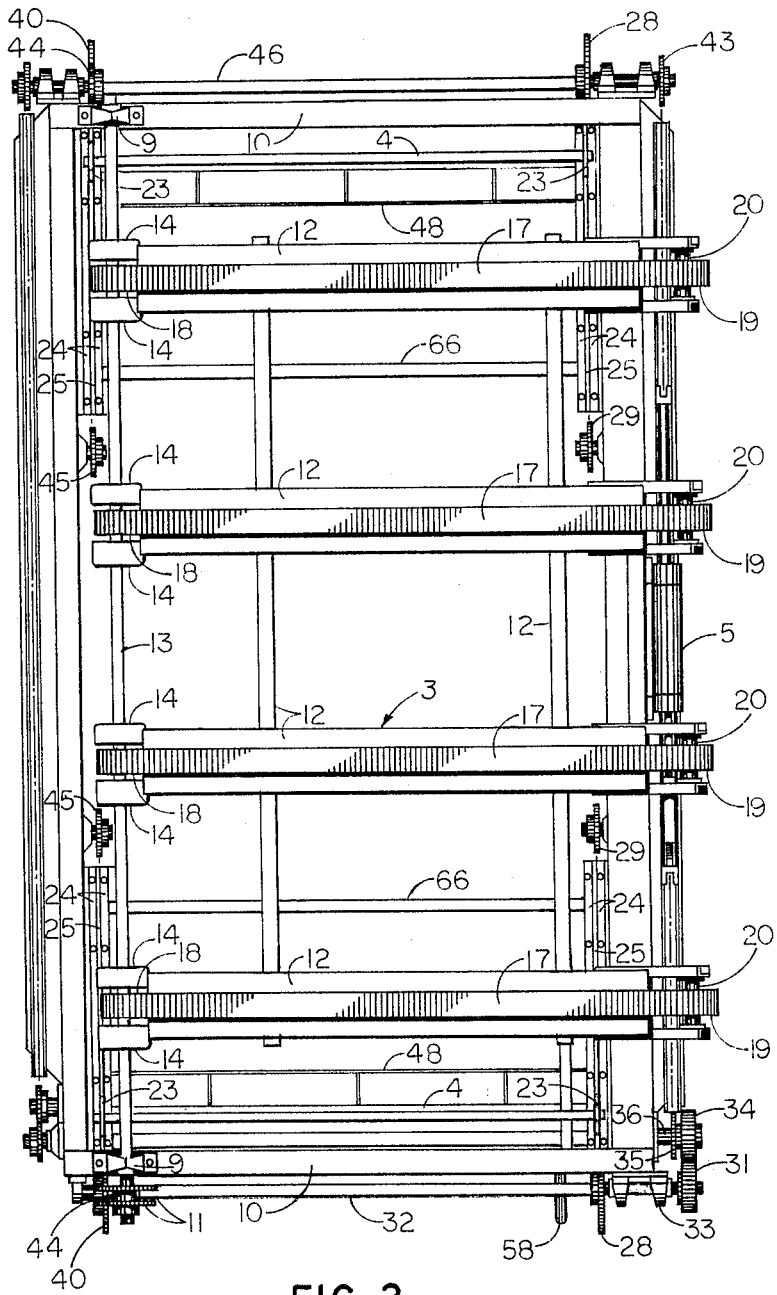
FIGS. 2, 3 and 4 are plan, side and front views respectively of a single collecting and stacking unit showing the essential elements of the invention.
Figure 3:
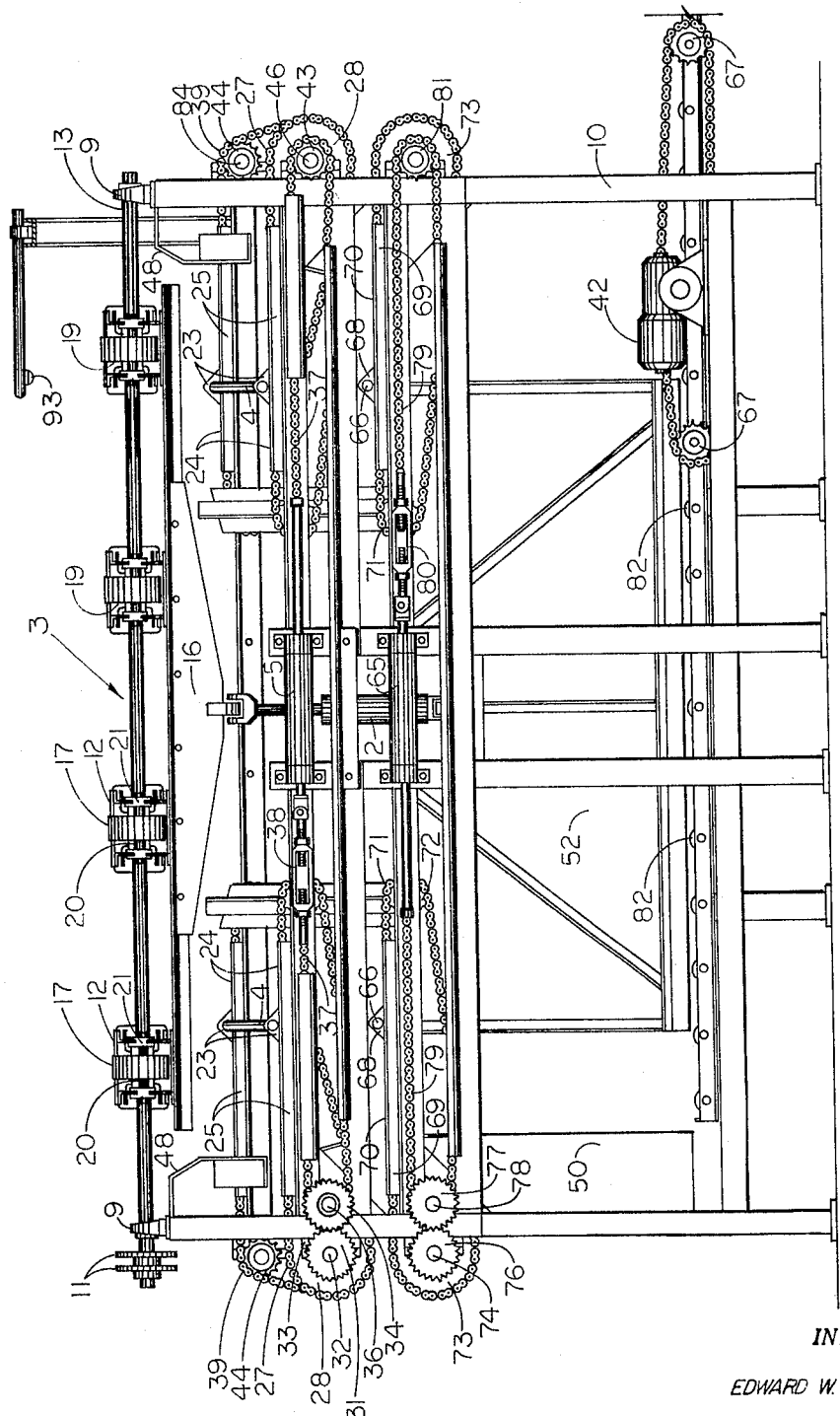

Each tipple consists of a framework 12, FIGS. 2, 3 and 4, mounted on a shaft 13 by means of bearing housings 14, FIG. 2, so that shaft 13 may rotate independently of the movement of framework 12. The tipple 3 is raised or lowered by air cylinder 2, FIG. 4, which is attached to framework 10 at one end, with its piston rod being connected to the tipple lifting yoke 16 which in turn is attached to the framework 12 of tipple 3. Up or down movement of the air cylinder's 2 piston rod causes the front end of the tipple 3 to move up or down by pivoting about shaft 13. Movable conveyor belts 17 are provided on each tipple 3 so that sheets can be transported across the tipple 3. Motive power to the conveyor belts 17 is supplied through shaft 13 by means of drive pulley 18 firmly fixed to the shaft 13. The opposite, or undriven, end of the tipple belt 17 is carried by an idler pulley 19, FIG. 3 and FIG. 4, attached to the tipple framework 12 through idler shaft 20. So that the tension of each belt on the tipple can be adjusted, idler shaft 20 is supported in an adjustable take-up bearing 21 which can be adjusted through movement of take-up screw 22 which in turn is attached to the tipple framework 12.

To provide for the smooth transfer of sheets from tipple 3 to receiving rods 4, the receiving rods are inclined so that they are nearly parallel to the plane of the tipple when the tipple is in the lowered position. The receiving rods 4 comprise two solid round bars connected at each end to movable carriers 23, FIGS. 3 and 4, which move back and forth in metal guides 25 and are retained in the guides by retaining strips 24 bolted to the top of each guide thus preventing vertical movement of carriers 23 as they move back and forth from retracted to extended position. Movement of the receiving rods 4 is provided through roller chain 27, both ends of which are connected through sprockets 28 and 29, FIG. 2, to carrier 23. Direction of rotation of the sprockets 28 and 29 dictates the direction of movement of carriers 23. It will be noted that the carrier guide 25, FIG. 4, on the sheet entrance side of the collecting mechanism is positioned at a higher elevation than the carrier guide 25 at the opposite side of the collecting mechanism to provide for the inclined attitude of receiving rods 4. Rotation of roller chain sprockets 28 and 29 is provided through spur gear 31 which is keyed together with sprocket 28 to rear shaft 32 mounted on the back side of the collecting mechanism framework 10 through bearings 33. Spur gear 31 is rotated by spur gear 34, which is keyed together with roller chain sprocket 35 to idler shaft 36. Roller chain sprocket 35 is powered by roller chain 37, FIG. 3, one end of which is connected to turnbuckle 38, which in turn is connected to one end of the piston rod of double-end rod-cylinder 5, which is the power or motivation source for receiving rods 4. The other end of roller chain 37 is connected through sprockets 35 and 43, FIG. 2, to the opposite end of double-end rod-cylinder 5 which is mounted on framework 10 of the collecting mechanism. Thus movement of the piston rod of double-end rod-cylinder 5 in one direction causes the retraction of receiving rods 4 and movement in the opposite direction causes the extension of receiving rods 4 for receiving the sheets as they enter the collecting mechanism. So that both ends of the receiving rods 4 will move simultaneously without binding in the rod carrier guides 25, shaft 32 extends across the width of the collecting mechanism. At the sheet entrance side of the collecting mechanism, sprocket 40 is keyed to shaft 32 so that the same motion of sprocket 28 is transferred to sprocket 40. Sprocket 40 transfers its motion to sprockets 44 and 45 through roller chain 39 which is connected at each end of rod carriers 23, as mentioned above. Drive to the receiving rods 4 at the end of the collecting mechanism opposite shaft 32 is accomplished in the same manner as described above through idler shaft 84.

To provide for partial alignment of sheets as they enter the collecting mechanism, metal shears 48, 49, 50 and 51, FIGS. 4 and 8, are fastened to the interior of the collecting mechanism. To provide for the collection of different sizes of sheets by the same collecting mechanism, an adjustable guide 52, FIG. 8, is positioned at the side of the collecting mechanism opposite the sheet entrance side. The adjustable guide consists of a metal plate connected at each end of frame 10 to brackets 53 which in turn are fastened to and supported by pipe 54, which in turn is rigidly fixed to the collecting mechanism frame 10. Adjustment of guide 52 is provided by half-collars 56 fastened to pipe 54 by bolts 57 spaced apart by an appropriate distance determined by the variety of different width sheets intended to be collected in the collecting mechanism.

To adjust the guide for another size sheet, bolt 57 and half-collar 56 are removed from in front of pipe 54 at each end of the collecting mechanism, and handle 58 attached to bracket 53 is grasped by the operator and a helper on the opposite end, whereby the entire guide 52 is slid forward or backward. When the guide has been adjusted, half-collars 56 and bolts 57 are replaced on each side of bracket 53 to prevent movement of guide 52 after adjustment. It is recognized that movement of the guide 52 could also be done mechanically by several systems common to the art.

Final alignment of the sheets after they have fallen to the bottom of the collecting mechanism or on top of the pile of sheets previously collected is provided by bumper-gate 7, FIGS. 5, 6 and 7. Bumper-gate 7 is in the form of a bent metal sheet attached to shaft 59 which in turn is mounted at one end by flange bearing 60 fixed to frame 10 and at the other end by pillow block 61, also fixed to frame 10. Movement of bumper-gate 7 is provided through pivot-crank 62 which is attached to shaft 59 and to the piston rod of air cylinder 6 by a rod clevis to adjustable bracket 64 attached to frame 10. Bracket 64 provides adjustment through air cylinders 6, 63 and pivot crank 62 to the bumper-gate 7 allowing its bumping action to be adjusted. The purpose of long stroke cylinder 63 is to move bumper-gate 7 clear from the end of the collecting mechanism so that the stack of collected sheets can be removed. During the period that sheets are being collected, the piston rod of cylinder 63 is fully extended as shown, and only cylinder 6 operates to align the sheets by causing a bumping action of the bumper-gate 7. During the unloading operation cylinder 63 retracts its piston rod causing the bumper-gate 7 to open fully so that the collected sheets can be removed.

Unloading mechanism of the collecting bin is actuated either automatically or manually. Automatic unloading is accomplished through preset counter 30 that is included in the operator's control console along with the selector switches 89 which in turn actuate counter 30, one of which is required for each selector switch 89. When the counter 30 has reached its present accumulated total indicating the number of sheets that have been collected in the collecting mechanism to which it is connected, it energizes time delay relay 85, which, after a predetermined elapsed time period, energizes solenoids 86 and 87. Solenoid 86 activates an air valve which in turn causes double-end rod-cylinder 65 to move accumulator rods 66 from their normally retracted position to their extended position. At the same time that counter 30 energizes time delay relay 85, it also automatically resets itself so that the operation of the conveyor 1, tipple 3 and receiving rods 4 will continue normally but accumulating the number of sheets from a zero setting again. It should be noted that with the accumulator rods 66 in their extended positions the sheets entering the collecting mechanism and being dropped from the receiving rods 4 will now drop on top of accumulator rods 66 instead of dropping to the top of the stack of previously collected sheets and will continue to be collected on top of the accumulator rods until the rods 66 are retracted.

At the same time solenoid 86 is energized, solenoid 87 is also energized, which latter solenoid activates an air valve which in turn causes air cylinder 63 to retract its piston rod, thus causing bumper-gate 7 to open fully as mentioned previously. When bumper-gate 7 has opened, it activates limit switch 41 which in turn energizes unload gear motor 42 which is connected by roller chain sprockets and roller chains of conventional design to two live rolls 67, FIGS. 3 and 4, in the bottom of the collecting mechanism. When the two live rolls 67 rotate under the stack of collected sheets, they cause the stack to move out of the collecting mechanism through the open bumper-gate 7 and onto roll casing in front of the collecting mechanism. When the stack of veneer clears the open bumper-gate 7, it trips limit switch 47 which in turn de-energizes solenoid 87 causing the bumper-gate 7 to close back to its normal operating position. At the same time unload gear-motor 42 is de-energized stopping live rolls 67, so also is solenoid 86, causing the accumulator rods 66 to retract, dropping the accumulated sheets to the empty bottoms of the collecting bin mechanism and re-activating time delay relay 85 to return bumper-gate 7 to its normal operating pattern of aligning collected sheets within the collecting bin.

If for some reason it is desired to unload a collecting bin before the designated number of sheets have been collected as determined by counter 30, a manual push-button switch 88 is provided to by-pass counter 30 and cause the operations mentioned above without the automatic actuation features incorporated in counter 30.

Mechanical operation of accumulator rods 66 is in much the same manner as receiving rods 4 except that the plane of travel of accumulator rods 66 is parallel to the plane of the bottom of the collecting mechanism rather than being inclined as are receiving rods 4. The accumulator rods themselves consist of bearing mounted rollers similar to those commonly used in roller conveyors rather than solid bars as in the case of receiving rods 4. Thus, when the accumulator rods are retracting from beneath a stack of accumulated sheets the rods or rollers will rotate thus minimizing the power needed to retract accumulator rods 66 under a friction load. As in the case of the receiving rods 4, the bearing mounted rollers 66 are attached to rod carriers 68 which travel back and forth in carrier guides 69 and are restrained from vertical movement by retaining strips 70 which are bolted to carrier guides 69. Motion is transmitted to rod carriers 68 by roller chain 71 attached at each end of the rod carriers through roller-chain sprockets 72 and 73. Roller chain sprocket 73 is keyed directly to shaft 74 which is driven by spur gear 76 meshed with spur gear 77 which in turn is driven by a roller chain sprocket keyed to idler shaft 78, as is spur gear 77. The roller chain sprocket driving spur gear 77 is driven by roller chain 79 connected at one end to turnbuckle 80 which in turn is connected to one end of the piston rod of double-end rod-cylinder 65 and through roller chain sprockets 81 to the opposite end of the piston rod of double-end rod-cylinder 65. Thus, when the piston rod of cylinder 65 is extended in one direction, the accumulator rods retract outwardly of the collecting bin to catch the incoming sheets.

As mentioned previously, two powered rolls 67 are placed in the bottom of the collecting bin to unload the stacked sheets. Supplementing the powered rolls 67 are bearing mounted unpowered rollers 82 which form the main floor of the collecting bin. This completes the mechanical components and operation of the invention.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:

1. Apparatus for sorting, collecting and stacking sheet material comprising:
   (a) means defining a pocket for collecting sheet material of one sort, including an entrance opening in an upper portion of said pocket,
   (b) tipple conveyor means above and offset on one side of said pocket adjacent said entrance opening,
   (c) means for tilting said tipple conveyor means from a horizontal position to a downwardly tilting position for introducing sheet material through said entrance opening into the interior of said pocket,
   (d) retractable sheet receiving members disposed within said pocket just beneath said entrance opening for supporting a sheet fed through said opening from said tipple means,
   (e) said receiving members being inclined in the same direction and to substantially the same extent as said tipple conveyor means when the latter is in a downwardly tilting position,
   (f) and means for retracting said sheet receiving members from beneath a sheet supported thereby following transfer of said sheet from said tipple means to said receiving members.

2. Apparatus according to claim 1 wherein said means for retracting said sheet receiving members includes power cylinder means and motion translating means connecting said power cylinder means to said receiving members in a motion translating ratio of greater than one to one.

3. Apparatus for sorting, collecting and stacking sheet material comprising:
   (a) means defining a pocket for collecting sheet material of one sort,
   (b) said pocket including an entrance opening in the upper portion thereof and an exit opening through a lower side portion thereof,
   (c) first conveyor means for conveying sheet material one sheet at a time to said pocket, including a downwardly tilting conveyor portion above and to one side of said pocket for feeding sheets into said pocket through said entrance opening,
   (d) second conveyor means defining a bottom wall of said pocket for transferring sheets collected within said pockets horizontally through said exit opening,
   (e) a pair of laterally reciprocative sheet receiving members extending across the interior of said pocket and slightly downwardly from said entrance opening in the conveying direction for alternately supporting generally horizontally a sheet fed into said pocket and thence dropping said sheet vertically to said second conveyor means,
   (f) and conveyor operating means in association with said second conveyor means for actuating said second conveyor means in response to an accumulation of a predetermined number of sheets thereon.

4. Apparatus for sorting, collecting and stacking sheet material comprising:
   (a) bin means for collecting sheet material of one sort, including an entrance opening at the top of said bin means and an exit opening at the bottom thereof,
   (b) first conveyor means above said bin means for transferring sheet material one sheet at a time into said bin means through said entrance opening,
   (c) a pair of parallel, laterally reciprocative and downwardly inclined sheet receiving rods within said bin means just beneath said entrance opening for receiving sheets from said conveyor means,
   (d) means for alternately retracting said sheet receiving members from beneath a sheet supported thereby upon receipt of sheet from said conveyor means, and for extending said members for receiving a subsequent sheet from said conveyor means,
   (e) second conveyor means defining a floor of said bin means for receiving sheets released by said receiving members and unloading accumulated sheets from said bin means horizontally through said exit opening,
   (f) a pair of laterally reciprocative accumulator members disposed horizontally within said bin means intermediate said receiving rods and said floor, said accumulator members being normally retracted to permit the uninterrupted passage of sheets from said receiving members to said floor,
   (g) conveyor operating means for actuating said second conveyor means in response to an accumulation of a predetermined number of sheets thereon.
   (h) and accumulator operating means for extending said accumulator members laterally toward one another and catching sheets released by said receiving members upon the actuation of said second conveyor means and for retracting said accumulator members upon de-actuation of said second conveyor means.

5. Apparatus according to claim 4 wherein said bin means includes adjustable guide means defining sidewalls thereof for maintaining vertical alignment and a generally horizontal disposition of sheets within said bin means during the descent of said sheets from said receiving rods to said second conveyor means.

6. Apparatus according to claim 5 wherein said bin means includes vertically disposed and outwardly swinging bumper gate means normally closing said exit opening, including means for periodically swinging said bumper gate means inwardly of said bin means against a stack of sheets collected on said second conveyor means to maintain vertical alignment of said stack, and means for swinging said bumper gate means outwardly upon actuation of said second conveyor means to permit unloading of said bin means.

7. Apparatus for sorting, collecting and stacking sheet material comprising:
   (a) conveyor means for continuously conveying sheet material one sheet at a time,
   (b) means defining at least two sheet collecting bins arranged in the conveying direction beneath said conveyor means,
   (c) said conveyor means including downwardly pivotal conveyor sections one offset upstream from each of said bins for feeding sheets into the upper end of the downstream adjacent one of said bins,
   (d) a pair of sheet receiving members extending in the conveying direction across the interior of each said bin just beneath the upper end thereof for receiving sheets from an upstream adjacent one of said conveyor sections,
   (e) said sheet receiving members being inclined downwardly in said conveying direction and being laterally separable in a direction transverse to said conveying direction for releasing a sheet supported thereby,
   (f) an inspection station along said conveyor means upstream from said bins for inspecting sheets on said conveyor means,
   (g) control means at said inspection station for preselecting the one of said bins into which each sheet passing said inspection station is deposited,
   (h) said control means including means operable in response to preselection of one of said bins for, in sequence, pivoting downwardly the conveyor section immediately preceding the preselected bin and then separating said sheet receiving members within the preselected bin upon receipt of a sheet from the preceding said conveyor section.

8. Apparatus for sorting, collecting and stacking sheet material comprising:
   (a) a fixed conveyor table for conveying sheet material horizontally one sheet at a time,
   (b) a series of collecting bins corresponding to the number of sorts desired arranged side by side in the conveying direction beyond the offbear end of said conveyor table,
   (c) a series of tipple conveyors corresponding to the number of said bins arranged in continuation of said conveyor table above said bins, and pivoted for declination in said conveying direction,
   (d) each of said tipple conveyors being offset upstream from a different one of said bins for conveying sheets into the open upper ends of said bins when in a declined position,
   (e) a pair of elongate, parallel and laterally separable sheet receiving members extending downwardly across the interior of each said bin in said conveying direction at an angle of declination substantially the same as that of said tipple conveyors,
   (f) unloading conveyor means defining a fixed bottom of said bin for collecting sheets released from above by said receiving members and conveying the collected sheets horizontally from said bin,
   (g) adjustable guide means defining sidewalls of said bins for guiding the entrance of sheet into said bin and the vertical descent of sheets therethrough,
   (h) a pair of horizontally disposed and laterally separable accumulator members extending across said bin in said conveying direction beneath said receiving members for receiving sheets released by said receiving members when said unloading conveyor means is unloading said bin, (i) an inspection station along said conveyor table upstream from said bins for inspecting sheets conveyed therealong, (j) control means at said inspection station for preselecting the one of said bins into which each sheet passing said station is deposited, said control means including means operable in response to preselection of one of said bins for operating in predetermined sequence the collecting mechanisms of the preselected bin.

9. Apparatus for sorting, collecting and stacking sheet material comprising:

(a) means defining a pocket for collecting sheet material of one sort, including an entrance opening in an upper portion of said pocket through which sheets can be fed into said pocket, (b) movable conveyor means laterally adjacent said entrance opening for conveying sheet material generally horizontally into said pocket, (c) a pair of laterally spaced-apart and laterally reciprocative sheet-receiving rods extending continuously across an upper portion of said pocket in the downstream conveying direction of said conveyor means for receiving directly and supporting directly sheet material fed into said pocket by said conveyor means, (d) stop means adjacent the downstream ends of said receiving rods for limiting the downstream travel of sheet material on said rods, (e) and means for reciprocating said sheet-receiving rods laterally upon receipt of a sheet by said rods so as to permit said sheet to pass downwardly within said pocket.

10. Apparatus for sorting, collecting and stacking sheet material comprising:

(a) means defining a pocket for collecting sheet material of one sort, including an entrance opening in an upper portion of said pocket, (b) tipple conveyor means above and offset on one side of said pocket adjacent said entrance opening, (c) means for tilting said tipple conveyor means from a horizontal position to a downwardly tilting position for introducing sheet material through said entrance opening into the interior of said pocket, (d) retractable sheet-receiving members disposed within said pocket just beneath said entrance opening for supporting a sheet fed through said opening from said tipple means, (e) said receiving members extending in the conveying direction of said tipple conveyor means, (f) and means for retracting said sheet-receiving members from beneath a sheet supported thereby following transfer of said sheet from said tipple means to said receiving members.

11. Apparatus for sorting, collecting and stacking sheet material comprising:

(a) conveyor means for continuously conveying sheet material one sheet at a time, (b) means defining at least two sheet-collecting bins arranged in the conveying direction beneath said conveyor means, (c) said conveyor means including downwardly pivotal conveyor sections one offset upstream from each of said bins for feeding sheets into the upper end of the downstream adjacent one of said bins, (d) a pair of sheet-receiving members extending in the conveying direction across the interior of each said bin just beneath the upper end thereof for receiving sheets from an upstream adjacent one of said conveyor sections, (e) said receiving members extending in the conveying direction of said conveyor means, (f) an inspection station along said conveyor means upstream from said bins for inspecting sheets on said conveyor means, (g) control means at said inspection station for preselecting the one of said bins into which each sheet passing said inspection station is deposited, (h) said control means including means operable in response to preselection of one of said bins for, in sequence, pivoting downwardly the conveyor section immediately preceding the preselected bin and then separating said sheet-receiving members within the preselected bin upon receipt of a sheet from the preceding said conveyor section.

References Cited by the Examiner

UNITED STATES PATENTS

| | | | |
|---|---|---|---|
| 2,164,371 | 7/1939 | Ajello | 214—6 |
| 2,605,910 | 8/1952 | Kovatch | 271—64 X |
| 3,083,013 | 3/1963 | Morrison | 271—86 |
| 3,104,006 | 9/1963 | Jones | 209—74 X |

M. HENSON WOOD, JR., *Primary Examiner.*

R. A. SCHACHER, *Examiner.*